United States Patent [19]
Janse et al.

[11] Patent Number: 5,390,250
[45] Date of Patent: Feb. 14, 1995

[54] ECHO CANCELLER WITH IMPROVED DOUBLETALK DETECTION

[75] Inventors: Cornelis P. Janse; Franciscus A. M. van de Laar, both of Eindhoven, Netherlands

[73] Assignee: U.S. Phillips Corporation, New York, N.Y.

[21] Appl. No.: 810,776

[22] Filed: Dec. 17, 1991

[30] Foreign Application Priority Data

Dec. 18, 1990 [NL] Netherlands ............ 9002790

[51] Int. Cl.$^6$ ............................................. H04M 1/58
[52] U.S. Cl. .................................. 379/410; 379/411; 379/407; 379/409; 379/392; 370/32.1
[58] Field of Search ............... 379/392, 406, 407, 409, 379/410, 411, 420; 370/32.1

[56] References Cited

U.S. PATENT DOCUMENTS

| | | | |
|---|---|---|---|
| 4,712,235 | 12/1987 | Jones, Jr. ................. | 379/406 X |
| 4,894,820 | 1/1990 | Miyamoto et al. ............. | 379/410 X |
| 4,998,241 | 3/1991 | Brox et al. ................ | 379/406 X |

Primary Examiner—James L. Dwyer
Assistant Examiner—Paul A. Fournier
Attorney, Agent, or Firm—Jack D. Slobod

[57] ABSTRACT

An echo canceller for use in send/receive apparatus includes a frequency-domain adaptive filter which provides filter parameters to a time-domain programmable filter. The programmable filter produces a signal $y(k)$ which is an estimate of the echo signal produced by acoustic coupling between a loudspeaker in the received path and a microphone in the send path. By subtracting this estimate from the signal produced in the send path, an output signal $r(k)$ is obtained from the send path which is essentially free of echoes. An accurate estimate of the echo signal cannot be obtained if a send signal is present at the input of the send path. Therefore, detecting means in the adaptive filter detects whether such a send signal is present and in that case blocks the transfer of filter parameters from the adaptive filter to the programmable filter. Erroneous modification of the estimated echo signal is thereby avoided. Detection of the presence of a send signal is based on whether the ratio of the power of the signal $z(k)$ in the send path to the power of an output signal of the adaptive filter exceeds a specific threshold.

6 Claims, 4 Drawing Sheets

ECHO CANCELLER WITH IMPROVED DOUBLETALK DETECTION

BACKGROUND OF THE INVENTION

1. Field of the Invention

The invention relates to an echo canceller comprising a receive path and a send path, the two having each an input and an output, the output of the receive path being connected to the input of an adaptive filter comprising adapting means, which filter has an impulse response which is an estimate of the impulse response of an echo path between the output of the receive path and the input of the send path, the input of the send path being coupled to a first input of a subtractor circuit and the output of the adaptive filter being coupled to a second input of the subtractor circuit, and the output of the subtractor circuit being coupled to the output of the send path; this echo canceller also including detecting means which generates a control signal for blocking the adapting means if the detecting means detect a locally generated signal at the input of the send path.

2. Description of the Related Art

An echo canceller of this type is known from Dutch Patent Application 8701633 which corresponds to U.S. Pat. No. 4,903,247.

In full-duplex signal transmission the presence of an undesired echo path between the output of the receive path and the input of the send path, and the presence of such an echo path at the far-end may cause a closed signal loop to develop. Such a situation may occur, for example, in telephony with the aid of loudspeaking telephone sets.

Because amplifiers are included in the send path, loop gain for a specific frequency may be greater than 1. Consequently, a type of oscillation occurs also denoted acoustic feedback when speech transmission is concerned.

If the acoustic feedback is smaller than 1, oscillation will not occur, it is true, but after a certain delay an echo of the signal applied to the input of the send path will appear at the output of the receive path via the far-end echo path. In telephony this means that a speaker hears his own voice delayed by a specific period of time. This phenomenon is experienced as extremely annoying especially in case of long delays.

In order to suppress these echoes, controllable attenuators included in the send and receive paths are utilized in known fashion. In the case where only a near-end signal generated by a near-end speaker is present, the attenuator in the send path has a high transfer factor $A_{max}$ and the attenuator in the receive path a low transfer factor $A_{min}$. In the case where only a signal coming from the far end is available, the attenuator in the receive path has a high transfer factor $A_{max}$ and the attenuator in the send path a low transfer factor $A_{min}$. In the case where there is a near-end generated signal as well as a far-end generated signal available, the two attenuators are set to an equal transfer value which equals $\sqrt{A_{max}*A_{min}}$. In all cases the loop gain is now reduced to such an extent that the problems caused by echo signals are strongly reduced. A problem with this type of echo cancelling is that the beginning of a speech signal is either not transferred or is transferred in a strongly attenuated manner, because after the detection of the speech signal a specific amount of time is required before the attenuators can be adjusted to a correct transfer factor. In addition, when doubletalk occurs, the transfer factor will be lower than necessary because the two loudspeaking telephone sets introduce an attenuation both in the send and receive paths. Consequently, when doubletalk occurs, the signal received from the far end will be so attenuated that the two speakers almost cannot hear each other any more.

A better method of transferring the beginning of a speech signal or speech signals in case of doubletalk, without affecting the echo cancelling, is to use an echo canceller either alone or in combination with adjustable attenuators inserted in the send and/or receive path. This echo canceller comprises an adaptive filter having an impulse response which is an estimate of the impulse response of the echo path between the output of the receive path and the input of the send path. Feeding the output signal of the receive path to the input of the adaptive filter causes an estimate of the echo signal to be available at the output of the adaptive filter.

By subtracting the output signal of the adaptive filter from the input signal of the send path, a difference signal is obtained which comprises only the near-end generated input signal of the send path in addition to the remainder of the echo signal.

The desired impulse response of the adaptive filter is calculated by the adapting means on the basis of the difference signal found. This is only feasible if the difference signal comprises only the remainder of the echo signal. If a near-end generated signal is present at the input of the send path, this near-end generated signal will also be present in the difference signal. Because the adapting means in the adaptive filter cannot make any distinction between a remainder of the echo signal and a near-end generated signal, a proper adaptation of the impulse response of the adaptive filter will be disturbed. In order to avoid this, the adapting means will be blocked if the detection means detect a near-end generated signal.

In the echo canceller known from afore-mentioned Dutch Patent Application, this detection is performed by detecting means which calculates the ratio of the signal power of the difference signal to the signal power of the input signal of the send path and comparing this ratio with a given threshold. If this ratio exceeds the threshold, a near-end generated signal is assumed to be present. This is because once the adaptive filter has been adjusted the ratio of the signal power of the difference signal (which signal is then equal to the residual signal) to the signal power of the input signal of the send path will be relatively small (order of magnitude: 0.01–0.001) when a locally generated signal is absent.

A general problem for echo cancellers is that the adaptive filter is unable to adapt its own impulse response sufficiently rapidly when there is a fast change of the impulse response of the echo path. Consequently, the ratio of the signal power of the difference signal to the signal power of the input signal of the send path strongly increases and the detection means could erroneously detect the presence of a near-end generated signal even when it is not actually present.

SUMMARY OF THE INVENTION

It is an object of the invention to provide an echo canceller of the type mentioned in the opening paragraph in which the probability of the detection means erroneously detecting the presence of a near-end generated signal is considerably reduced compared with an echo canceller according to the state of the art.

For this purpose, the echo canceller according to the invention is characterized in that the detection means detect a near-end generated signal based on whether the ratio of the power of the input signal in the send path to the power of the output signal of the adaptive filter exceeds a threshold value.

The invention is based on the understanding that the power of the output signal of the adaptive filter for specific types of echo paths (for example, acoustic echo paths) is a good measurement of the power of the echo signal at the input of the send path, even if the impulse response of the echo path as such changes relatively fast. This property will be discussed in further detail hereinbelow.

If the output signal of the receive path may be considered white noise, the following holds according to a known theorem from the stochastic signal theory:

$$P_{iz} = P_{uo} \int_0^\infty h^2(\theta)d\theta \qquad (1)$$

In (1) $P_{iz}$ is the signal power of the input signal of the send path, $P_{uo}$ the signal power of the output signal of the receive path and $h(\Theta)$ is the impulse response of the echo path at instant $\Theta$. For certain types of echo paths it holds that the impulse response of the echo path may change considerably, but that the integral according to formula (1) remains substantially constant.

For example, in telephony by means of laudspeaking telephone sets, the mean value of the squared impulse response $h(\Theta)$ of the echo path over a specific time $\delta\Theta(\delta\Theta<<\Theta)$ at any instant is mainly determined by the ratio of the instant $\Theta$ to the reverberation time of the room in which the telephone set is located. This property is known from the book entitled "Principles and Applications of Room Acoustics", vol. 1, L. Cremer & H. Müller, published by Applied Science Publisher. If the impulse response of the echo path changes, for example, because a speaker walks up and down, this will hardly affect the reverberation time of the room and the square value of the impulse response of the echo path at a given instant will remain substantially equal. The integral according to formula (1) will, for that matter, be substantially independent of changes in the echo path.

Simulations and experiments have shown that in addition to white noise it also holds for speech signals that the signal power of the output signal of the adaptive filter is a proper measurement for the signal power of the part of the input signal of the send path coming from the receive path.

A remaining problem is that it is possible that if the adaptive filter has not yet been properly adjusted and if signal peaks appear in the output signal of the receive path, these signal peaks appear at the input of the send path at an earlier instant than at the output of the adaptive filter. Consequently, the signal power of the output signal of the adaptive filter is then much smaller than the signal power of the input signal of the send path. This may lead to an erroneous detection of a near-end generated signal being present at the input of the receive path.

The number of erroneous detections of the presence of near-end generated speech signals caused by the occurrence of signal peaks may now be further reduced in that the echo canceller is characterized in that the detection means determine the signal power of both said signals on the basis of the mean value of the instantaneous signal powers of these signals over a specific period of time.

Since the signal power is equal to the mean value of the instantaneous signal powers over a specific period of time, the effect of signal peaks on the signal power is reduced, reducing the chance of an erroneous detection of a near-end generated signal.

Generally, adaptive filters are arranged as transversal filters. Transversal filters comprise a series combination of delay elements, the output signals of the various delay elements being added together by means of adjustable weight factors. The use of transversal filters in adaptive filters presents the advantage that undesired spontaneous oscillation will be absent for all the possible weight factors due to the absence of feedback paths. In addition, when these filters are used, the adaptation process leads to an optimum estimate of the impulse response to be simulated. These properties of transversal filters are described in the book entitled "Discrete-Time Signal Processing", by A. van der Enden & N. Verhoeckx, published by Prentice Hall.

Another property of these filters is that their impulse response is of a limited duration $T_f$, which duration is equal to the sum of the delays of the individual delay elements. In most cases, however, the impulse response of the echo path, on the other hand, will be infinitely long. Therefore, if the adaptive filter is adjusted, the impulse response of the adaptive filter and the impulse response of the echo path at instants situated between 0 and $T_f$ will be substantially equal. For instants greater than $T_f$ the impulse response of the adaptive filter is equal to 0, whereas the impulse response of the echo path will then be unequal to 0. The integral in formula (1) will then always be greater for the impulse response of the echo path than the integral for the impulse response of the adaptive filter, because the integral for the impulse response of the echo path comprises an extra contribution of the impulse response of the echo path at instants greater than T. Consequently, the signal power of the output signal of the adaptive filter is always smaller than the power of the echo signal. This difference in signal powers could reduce the reliability of the detection of a near-end generated signal.

In order to further enhance the reliability of the detection of the presence of a near-end generated signal, the echo canceller is characterized in that the detection means add a correction term to the signal power valid at a current instant of the adaptive filter output signal, before the ratio is determined by the detection means.

The addition of a suitable correction term to the signal power of the adaptive filter output signal, prior to this signal power being compared with a signal power of the input signal of the send path, enhances the reliability of this comparison.

Another consequence of the finite duration of the impulse response of the transversal filter is that the input signal of the send path is gradually attenuated to zero at the end of a speech signal received from the far end, whereas the output signal of the transversal filter abruptly becomes equal to zero at time interval $T_f$ after the speech signal has ended. Consequently, the signal power of the input signal of the send path is suddenly much greater than the signal power of the output signal of the transversal filter, so that it may be erroneously inferred that a near-end generated signal is available at the input of the send path.

An embodiment of an echo canceller according to the invention which reduces this effect is characterized in that the correction term is a sum weighted with a weight factor of the signal powers of the adaptive filter output signal situated at a number of measuring instants in a time interval ending at the current instant, reduced by the duration of the impulse response of the adaptive filter. The weight factor is a monotonously decreasing exponential function of the difference between the current instant and the measuring instant.

Due to these measures a correction term is added to the signal power of the echo canteller output signal, which correction term is representative of the error in this signal power due to the limited duration of the impulse response of the transversal filter. This correction term is equal to the weighted sum of signal powers of the output signal of the transversal filter at instants $t-\tau$, t is the current instant and where $\tau > T$. As a result, the corrected signal power also depends on the signal powers at instants situated before t-T, so that the influence of the limited duration of the impulse response of the transversal filter is reduced. The weight factor is equal to the squared estimate of the impulse response of the echo path at an instant $\tau$ because the squared impulse response denotes how much the signal power is attenuated with time.

In telephony, when loudspeaking telephone sets are used the impulse response of the echo path is determined by the room in which the telephone set is located. From the afore-mentioned text "Principles and Applications of Room Acoustics" it is known that the square of the impulse response of such a room may be estimated by an exponential function of $\tau$ so that the correction term contains such a function.

By adding the correction term to the signal power of the output signal of the transversal filter, the instant at which the corrected signal power of the output signal of the adaptive filter suddenly becomes zero is postponed, so that the signal power of the input signal of the send path has been reduced even further by the time the corrected signal power becomes equal to 0. Consequently, the chance of erroneously detecting a nearend generated signal is reduced.

BRIEF DESCRIPTION OF THE DRAWING

The operation of the invention will now be further explained with reference to the drawing Figures, in which.

DETAILED DESCRIPTION OF THE REFERENCED EMBODIMENTS

Figure 1:
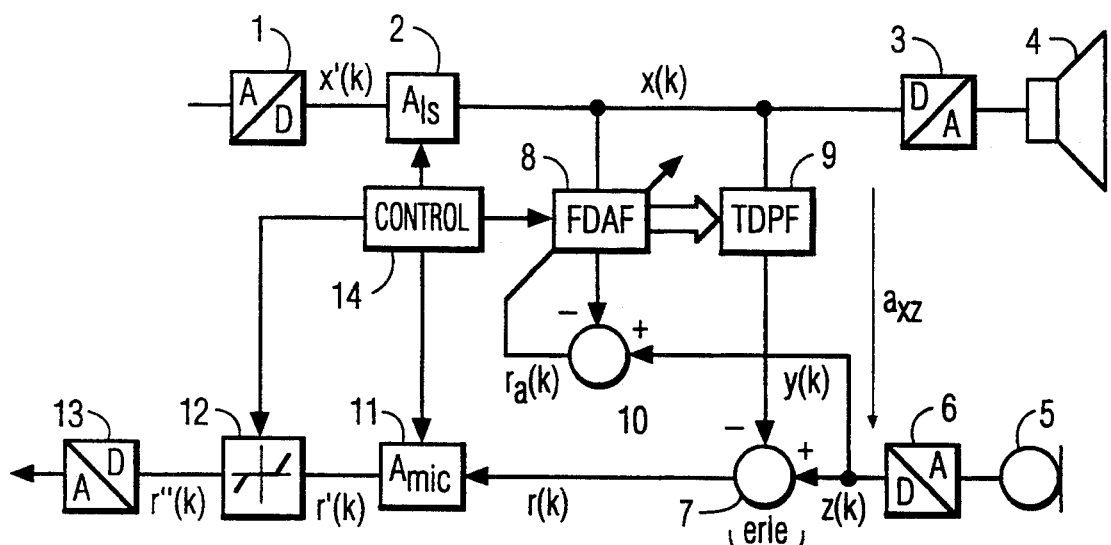
FIG. 1 shows a block diagram of an echo canceller to be used in a loudspeaking telephone set.

In the echo canceller in FIG. 1 the input of the receive path is connected to the input of an analog-to-digital converter 1. The output of the analog-to-digital converter 1 is an output signal x'(k) which is supplied to the input of an attenuator 2 having a transfer factor $A_{ls}$, the transfer factor and being adjustable by means of a control signal. The output of attenuator 2 is an output signal x(k) which is supplied to the input of a frequency-domain adaptive filter 8, which filter comprises adapting means, to the input of a time-domain programmable filter 9, and to the input of a digital-to-analog converter 3. The output of the digital-to-analog converter 3, which constitutes the output of the receive path, is connected to a loudspeaker 4.

The output of a microphone 5 is connected to the input of an analog-to-digital converter 6, which input likewise forms the input of the send path. The output of the analog-to-digital converter 6 is an output signal z(k) which is supplied to a first input of a subtractor circuit 7 and also to a first input of another subtractor circuit 10. A second input of the time-domain subtractor circuit 7 is connected to an output of the programmable filter 9, which produces an output signal y(k). A second input of the subtractor circuit 10 is connected to an output of the adaptive filter 8, which filter comprises impulse response adapting means. The output of the subtractor circuit 10 is an output signal $r_a(k)$ which is supplied to a residual signal input of the adaptive filter 8.

The output of the subtractor circuit 7 is an output signal r(k) which is supplied to the input of an attenuator 11 having a transfer factor $A_{mic}$ which is adjustable by a control signal. The output of the attenuator 11 is an output signal r''(k) which is supplied to the input of a threshold circuit 12 which can be adjusted by a control signal. The output of the threshold circuit 12 is an output signal r''(k) which is supplied to the input of a digital-to-analog converter 13. The output of the digital-to-analog converter 13 forms the output of the send path.

A first output of a control unit 14 is connected to the control input of the attenuator 2. A second output of the control unit 14, providing a control signal to block the adapting means in adaptive filter 8, is connected to the control input of the attenuator 11. A third output of the control unit 14 is connected to a control input of the adaptive filter 8, whereas a fourth output of the control unit 14 is connected to the control input of the threshold circuit 12. The adaptive filter 8 has an output bus for transferring parameters to the programmable filter 9 for programming the impulse response thereof.

In FIG. 1 the input signal of the receive path is applied to the analog-to-digital converter for further processing of this signal in digital form. The function of the complete echo canceller may be achieved by a digital signal processor of the DSP56001 type (Motorola). The output signal of the analog-to-digital converter 1 is fed via the adjustable attenuator 2 to the digital-to-analog converter 3 which converts the signal to an analog signal suitable for the loudspeaker 4.

The microphone 5 in the send path receives the local speech signal together with an echo of the signal reproduced by the loudspeaker. The output signal of the microphone 5 is converted to a digital signal z(k) by the analog-to-digital converter 6. The subtractor circuit 7 subtracts an estimate of the echo signal y(k) from the signal z(k), so that a signal r(k) is obtained which substantially solely consists of the local speech signal. This signal r(k) is fed via the attenuator 11 and the threshold circuit 12 to the digital-to-analog converter 13 which converts the signal r"(k) to a signal suitable to feed to the telephone line.

The complete adaptive filter comprises a combination of frequencydomain adaptive filter 8 and a time-domain programmable filter 9. The impulse response of the complete adaptive filter is adapted to the impulse response of the echo path by the adapting means in the frequency-domain adaptive filter 8. The estimate y(k) of the echo signal, which estimate is subtracted from the signal z(k), is calculated by the time-domain programmable filter 9, which for that purrpose receives parameters for adjusting the desired impulse response from the frequency-domain adaptive filter.

When a local speech signal is present at the input of the send path it disturbs the adaptation of the impulse response of the adaptive filter 8. In order to avoid that this disturbed adaptation will lead to an erroneous estimate of the impulse response of the echo path, the two filters 8 and 9 are used. If the signal power of the residual signal $r_a(k)$ is greater than the signal power of the residual signal r(k), or if a near-end generated speech signal is detected, the adaptation of the adaptive filter 8 will be disturbed and so the detection means in the filter 8 will block the transfer of parameters therefrom to the programmable filter. Consequently, the disturbance of the adaptation of the adaptive filter 8 will no longer have any effect on the estimate y(k) of the echo signal.

The adaptive filter 8 is realised in the frequency domain because a timedomain adaptive filter for the necessary length of the impulse response is of much greater complexity than a frequency-domain adaptive filter. In addition, a time-domain adaptive filter has the disadvantage that adapting its impulse response to the impulse response of the echo path for signals having a strong autocorrelation takes much longer than for a frequency-domain adaptive filter for which a decorrelation that is simple to implement is used. Introducing such decorrelation in a time-domain adaptive filter would involve much greater complexity.

The programmable filter 9 is realised in the time domain because the signal in such a filter is not subjected t dditional delay in contradistinction to a frequency-domain adaptive filter in which certain additional delay is unavoidable. The structure and operation of these filters is further discussed in the afore-mentioned Dutch Patent Application.

In order to assume that the power of the undesired echo signals, even if the adaptive filter has not yet been properly adjusted, remains below a certain level, the sum signal power transfer between the input of the receive path and the output of the send path is maintained at a constant value $A_{tot}$ by means of the attenuators 2 and 11. For calculating the correct value for the transfer factor of the attenuators, the value of the echo transfer ERLE of the adaptive filter and the value of the acoustic attenuation $A_{xz}$ are calculated on the basis of the mean signal powers $P_x$, $P_z$ and $P_r$ over a specific period of time. From the values of $A_{tot}$, ERLE and $A_{xz}$ the product $A_{vsw}$ of the transfer factors $A_{1s}$ and $A_{mic}$ can be calculated with the aid of:

$$A_{vsw} = A_{1s} A_{mic} = \sqrt{\frac{A_{tot}}{ERLE \, A_{xz}}}$$

Distribution of the product $A_{1s}$ and $A_{mic}$ over the two attenuators 2 and 11 depends on the activity of the speakers, which is measured by detection means present in the control unit. If only the speaker at the far end speaks, $A_{1s}$ is set at 1 and $A_{mic}$ at $A_{vsw}$. If only the speaker at the near end speaks, $A_{1s}$ is set at $A_{vsw}$ and $A_{mic}$ at 1. If the two speakers are active, the transfer factor $A_{vsw}$ is uniformly distributed over the two attenuators 2 and 11. The transfer factors $A_{1s}$ and $A_{mic}$ are not adapted suddenly but gradually in order to avoid strong clicking sounds in the loudspeaker signal.

The threshold circuit 12 is used for blocking a small residual echo, whereas a local speech signal is to be transferred substantially completely. For this purpose, the threshold circuit 12 produces an output signal which is equal to zero if the input signal remains below a threshold, and an output signal which linearly depends on the input signal if the input signal exceeds the threshold. The threshold is only present in cases where only the far-end speaker is active. In other cases the transfer of the threshold circuit is equal to 1.

The signal powers $P_x$, $P_z$ and $P_r$ are calculated by averaging the value of the instantaneous powers of these signals over blocks having a time duration T. At the beginning of each block the activity of the speakers is determined. The values of the various transfer factors ERLE, $A_{xz}$ and $A_{vsw}$, used for adjusting the attenuators 2 and 11, are determined only every fourth block. This is done because these calculations require averaging of the various signal powers over a rather long period of time (4.T) to reduce the effect of signal peaks.

Figure 2:
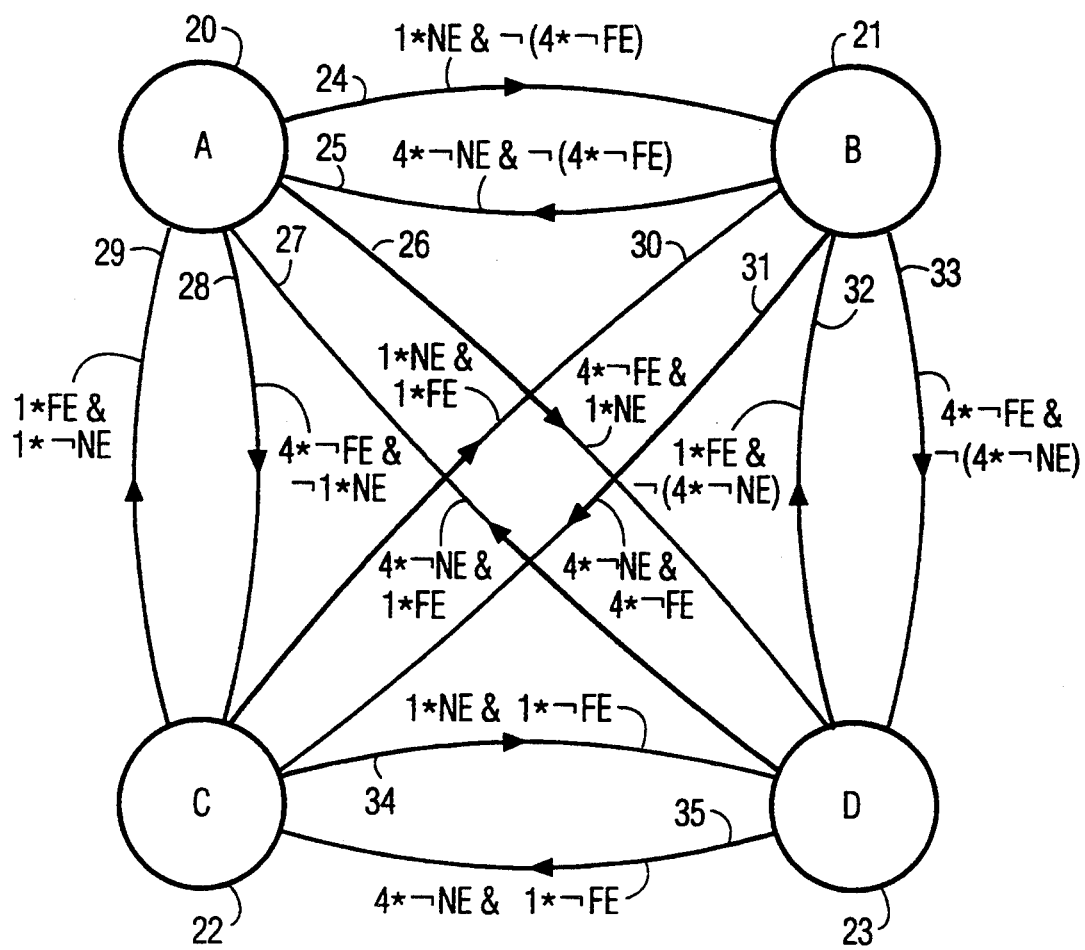
FIG. 2 shows a state diagram of an echo canceller shown in FIG. 1, representing the activity of two speakers.

In the state diagram shown in FIG. 2 the states and the transition conditions have the following connotations:

| NUMBER | INSCRIPTION | CONNOTATION |
| --- | --- | --- |
| 20 | A | Far-end speaker is active. |
| 21 | B | Both speakers are active. |
| 22 | C | Neither speaker is active. |
| 23 | D | Near-end speaker is active. |
| 24 | 1*NE & ¬(4*¬FE) | Near-end speech signal in previous block. |
| 25 | 4*¬NE & ¬(4*¬FE) | No near-end speech signal in four preceding blocks. |
| 26 | 4*¬FE & 1*NE | No far-end speech signal in four preceding blocks, but near-end speech signal in previous block. |
| 27 | 4*¬NE & 1*FE | No near-end speech signal in four preceding blocks, but far-end speech signal in previous block. |
| 28 | 4*¬FE & ¬1*NE | No far-end speech signal in four preceding blocks. |
| 29 | 1*FE & 1*¬NE | Far-end speech signal in previous block. |
| 30 | 1*NE & 1*FE | Near-end speech signal and far-end speech signal in previous block. |
| 31 | 4*¬NE & 4*¬FE | Neither near-end speech signal nor far-end speech signal in four preceding blocks. |
| 32 | 1*FE & ¬(4*¬NE) | Far-end speech signal in previous block. |
| 33 | 4*¬FE & ¬(4*¬NE) | No far-end speech signal in four preceding blocks. |
| 34 | 1*NE & 1*¬FE | Near-end speech signal in previous block. |
| 35 | 4*¬NE & 1*¬FE | No near-end speech signal in four preceding blocks. |

Because the various control signals for controlling the attenuators 2 and 11, the threshold circuit 12 and the adaptive filter 8 are derived from the speakers' activity, the speakers' activity is translated to four sta further shortened to FSM, whose state diagram is represented in FIG. 2. The FSM is in state A if only the far-end speaker is active. The FSM is in state B if both speakers are active. The FSM is in state C if neither speaker is active and is in state D if only the near-end speaker is active. The transitions between the various states are determined by the two speakers becoming active or inactive. A certain speaker is assumed to be active if in the previous block a speech signal was present in the signal originating from that speaker. A speaker is assumed to remain active until no further speech signal is present any more in four successive blocks of the signal coming from that speaker. This assumption is made to avoid the FSM changing state during pauses between words and sentences.

A far-end speech signal is assumed to be present if the signal power $P_x$ is greater than a background noise term $N_x$. A near-end speech signal according to the innovative idea is assumed to be present if the following inequality holds:

$$\delta[P_z(i)-N_z] > P_y(i) + \alpha^{-2}P_y(i-2) + \alpha^{-3}P_y(i-3)$$

or equivalently:

$$[P_z(i)-N_z]/[P_y(i)+\alpha^{-2}P_y(i-2)+\alpha^{-3}P_y(i-3)] > 1/\delta$$

In this inequality, $\delta$ or $\frac{1}{\delta}$ is a threshold value, $N_z$ a background noise term, $P_y(i)$ is the signal power of the signal y in the current block and $P_y(i-1)$, $P_y(i-3)$) are the signal powers of the signal y in the two preceding blocks. The exponential terms $\alpha^{-2}$ and $\alpha^{-3}$ together with the signal powers $P_y(i-2)$ and $P_y(i-3)$ form the correction term according to the innovative idea for cancelling the finite impulse response of the adaptive filter which has an impulse response 2T in length.

The Table below represents which actions belong to the four states of the FSM.

| State | $A_{mic}$ | $A_{ls}$ | Threshold circuit |
|---|---|---|---|
| A | $A_{vsw}$ | 1 | switched on |
| B | $\sqrt{A_{vsw}}$ | $\sqrt{A_{vsw}}$ | switched off |
| C (T < $T_h$) | previous value | previous value | switched off |
| C (T > $T_h$) | $\sqrt{A_{vsw}}$ | $\sqrt{A_{vsw}}$ | switched off |
| D | 1 | $A_{vsw}$ | switched off |

In state A the attenuator 11 is set at $A_{vsw}$ and the attenuator 2 at the transfer factor 1. The threshold circuit 12 is switched on. In state B the two attenuators 2 and 11 are set at a value $\sqrt{A_{vsw}}$, while the threshold circuit 12 is switched off. If the FSM remains in state C shorter than $T_h$, the transfer factors of the attenuators are maintained at a same value because if state C is shorter than $T_h$ the speaker who was speaking before state C was changed to will probably start speaking again. If state C takes longer than $T_h$, the probability for the near-end speaker or the far-end speaker to become active becomes equally great and the two attenuators are set at a value $A_{vsw}$. In state D only the near-end speaker is active and $A_{mic}$ will be set at 1 and $A_{ls}$ at $A_{vsw}$.

Figure 3:
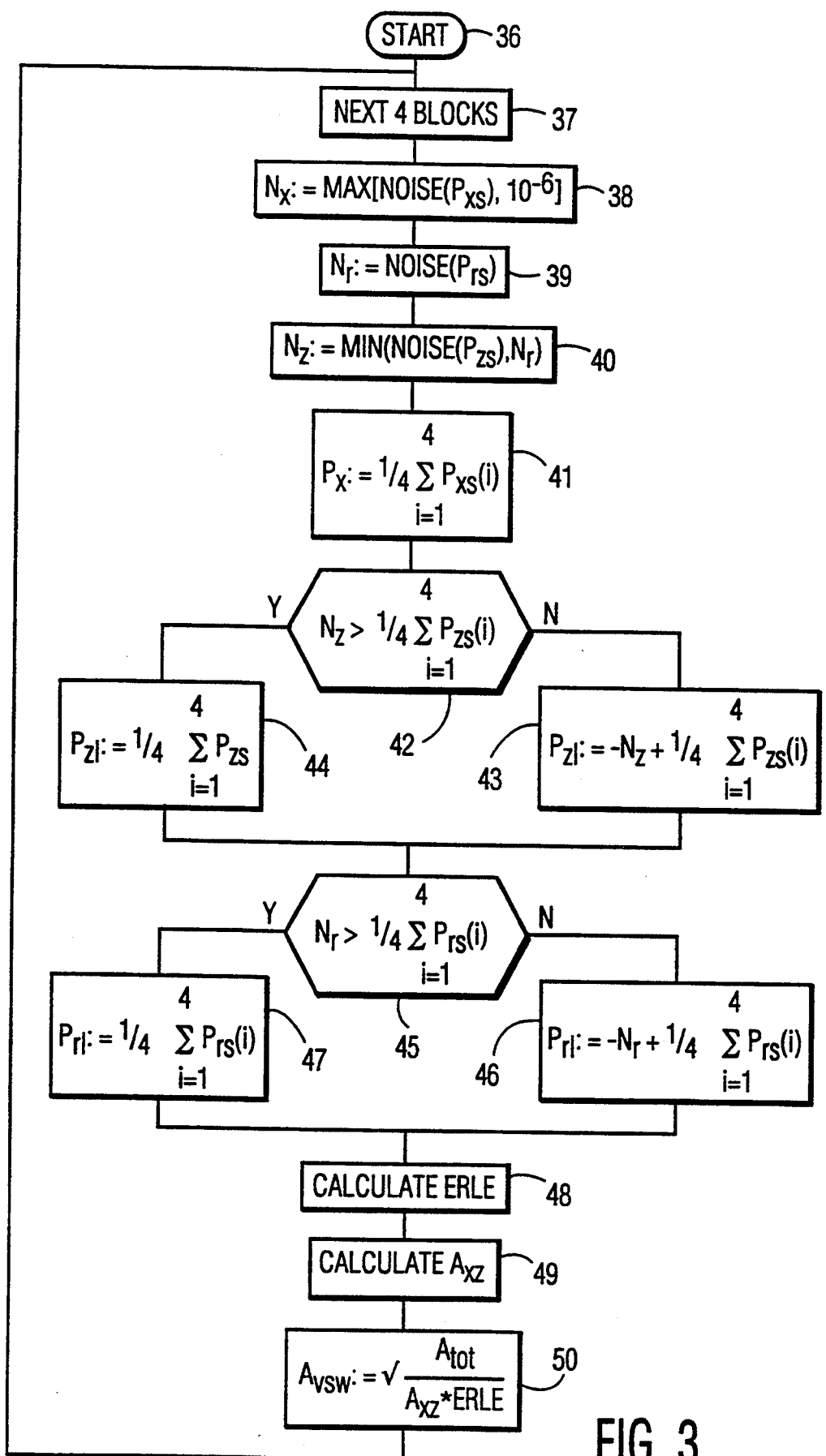
FIG. 3 shows a flow chart of a program for a programmable processor, for calculating a number of parameters necessary for adjusting the attenuators of the echo canceller shown in FIG. 1 to a proper value.

In FIG. 3 the numbered instructions have the connotations as will be described in the Table below.

| NUMBER | INSCRIPTION | CONNOTATION |
|---|---|---|
| 36 | START | All vaiables are initialized. |
| 37 | NEXT 4 BLOCKS | Waiting period until the next parameter values are to be calculated. |
| 38 | $N_x := MAX[NOISE(P_{xs}), 10^{-6}]$ | Background noise in signal x is calculated. |
| 39 | $N_4 := NOISE(P_{rs})$ | Background noise in signal r is calculated. |
| 40 | $N_z := MIN(NOISE(P_{zs}), N_r)$ | Background noise in signal z is calculated. |
| 41 | $p_x := \frac{1}{4} \sum_{i=1}^{4} P_{xs}(i)$ | Mean signal power over four blocks in signal x is calculated. |
| 42 | $N_z > \frac{1}{4} \sum_{i=1}^{4} P_{zs}(i)$ | The niose power in signal z is compared with the sum signal power of signal z. |
| 43 | $P_{z1} := -N_z + \frac{1}{4} \sum_{i=1}^{4} P_{zs}(i)$ | The mean signal power of the signal z over four blocks and corrected for background noise is calculated. |
| 44 | $P_{z1} := \frac{1}{4} \sum_{i=1}^{4} P_{zs}$ | The mean signal power of the signal z over four blocks is calculated. |
| 45 | $N_r > \frac{1}{4} \sum_{i=1}^{4} P_{rs}(i)$ | The noise power in signal r is compared with the sum signal power in signal r. |
| 46 | $Pr1 := -N_r + \frac{1}{4} \sum_{i=1}^{4} P_{rs}(i)$ | The mean signal power of the signal r over four blocks and corrected for background noise is calculated. |
| 47 | $P_{r1} := \frac{1}{4} \sum_{i=1}^{4} P_{rs}(i)$ | The mean signal power over four blocks in signal r is calculated. |
| 48 | CALCULATED ERLE | The echo attenuation of the adaptive filter is calculated. |
| 49 | CALCULATE $A_{xz}$ | The attenuation of the acoustic echo path is determined. |

| NUMBER | INSCRIPTION | CONNOTATION |
|---|---|---|
| 50 | $A_{vsw} := \sqrt{\dfrac{A_{tot}}{A_{xz} * ERLE}}$ | The overall transfer for the two attenuators 2 and 11 is determined. |

The programme of FIG. 3 is used for calculating the overall attenuation $A_{vsw}$ in the attenuators 2 and 11 necessary for maintaining the attenuation of the echo signal at a specific level.

At instruction 36 all constants and variables are initialized. At instruction 37 there is a wait until a time interval corresponding to four blocks has elapsed. At instruction 38 the background noise power $N_x$ in the signal x is determined by calling a function of NOISE. The noise value $N_x$ always gets a minimum value because the value $N_x$ is also used as a threshold for detecting a far-end speech signal. At instruction 39 the background noise power $N_r$ in the signal r is determined and at instruction 40 the background noise power $N_z$ in the signal z. If the noise power in signal x is large, the value of $N_z$ will mainly be determined by the noise in the echo signal instead of the near-end generated background noise signal. $N_r$ is then a better estimate for the nearend generated background noise signal because the noise signal originating from the loudspeaker is cancelled by the echo canceller. At instruction 41 the signal power $P_{x1}$ is determined on the basis of the sum of the signal powers $P_{x8}$ determined in the preceding four blocks. This renders $P_{x1}$ equal to 4× the mean value of $P_{x8}$. At instruction 42 the noise power in signal z is compared with a sum signal power which is equal to the signal power of signal z summed over 4 blocks. If 4 times the noise power exceeds this sum signal power, the estimate of the noise power is not correct and at instruction 44 the mean signal power over four blocks in signal z is not corrected for noise. If the noise power is smaller than the sum signal power, the noise-corrected signal power Pzl is determined at instruction 43. At instruction 45 the noise power in signal r is compared with a sum signal power that is equal to the signal power summed over four blocks in signal r. If 4 times the noise power exceeds this sum signal power, the estimate of the noise power is not correct and the mean signal power over four blocks in signal r is not corrected for noise at instruction 47. If the noise power is smaller than the sum signal power, the signal power $P_{r1}$ corrected for noise is calculated at instruction 46. At instruction 48 a sub-routine is called which calculates the echo transfer ERLE of the adaptive filter on the basis of the signal powers $P_{z1}$ and $P_{r1}$. At instruction 49 the acoustic attenuation $A_{xz}$ of the echo path is calculated. At instruction 50 the necessary residual overall transfer factor $A_{vsw}$ of the attenuators 2 and 11 is calculated on the basis of the variables ERLE and $A_{xz}$. Calculating the square root at instruction 50 is necessary because $A_{xz}$ and ERLE are signal power transfer factors, whereas $A_{vsw}$ is an amplitude transfer factor. Once instruction 50 has been carried out, instruction 37 is reverted to where the passage of 4 blocks is waited for.

Figure 4:
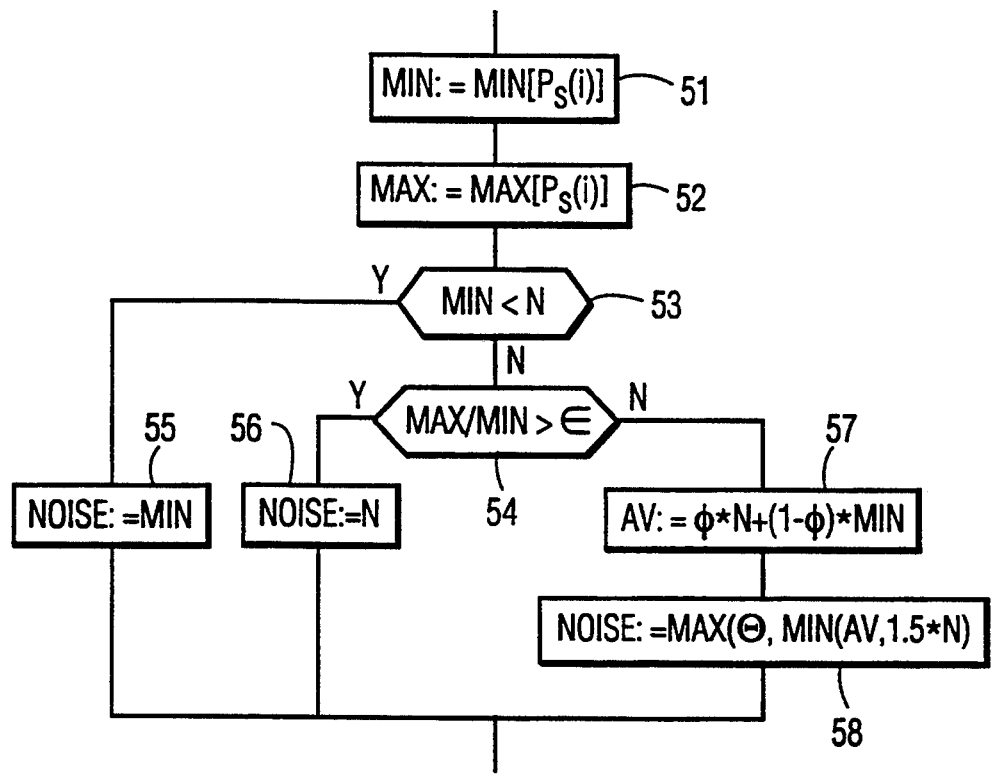
FIG. 4 shows a flow chart of a function for calculating the background noise power of the received and sent signal to be utilized in a program according to FIG. 3.

In FIG. 4 the numbered instructions have the connotations as described in the Table below.

| NUMBER | INSCRIPTION | CONNOTATION |
|---|---|---|
| 51 | MIN: = MIN[$P_s(i)$] | The minimum value of the signal power in the preceding four blocks is calculated. |
| 52 | MAX: = MAX[$P_s(i)$] | The maximum value of the signal power in the preceding four blocks is calculated. |
| 53 | MIN < N | The variable MIN is compared with the previous value of the noise power. |
| 54 | MAX/MIN > $\epsilon$ | The ratio of the variable MAX to MIN is compared with a constant E. |
| 55 | NOISE: = MIN | The result of the function of NOISE is made equal to the variable MIN. |
| 56 | NOISE: = N | The result of the function of NOISE is made equal to the previous value of the noise power. |
| 57 | AV: = $\phi$*N + (1 − $\phi$)*MIN | The variable AV is made equal to the mean value of the previous noise power and the variable MIN. |
| 58 | NOISE: = MAX($\Theta$, MIN(AV, 1.5*N)) | The result of the function of NOISE is made equal to the maximum of the $\Theta$ values and an estimate of the previous noise level. |

In FIG. 4 first the minimum of the signal powers $P_s$ in the preceding 4 blocks is calculated at instruction 51. At instruction 52 the maximum of the signal powers $P_s$ in the preceding 4 blocks is calculated. At instruction 53 the variable MIN is compared with the previous noise value N. If MIN is smaller than N, the noise level is assumed to have decreased and the new value of the noise power is made equal to the variable MIN at instruction 55 after which the function is left. If MIN is not smaller than N, however, the ratio of MAX to MIN is compared with the constant $\epsilon$ at instruction 54. If this ratio exceeds $\epsilon$, it is assumed that the difference between MIN and MAX is relatively large, so that the signals in the preceding four blocks are not stationary and thus probably comprise speech. At instruction 56 the previous value of the noise power is then taken as an estimate of the noise power and after this the function is left. If the ratio of MIN to MAX is smaller than $\epsilon$, it is assumed that the signal is stationary and that the preceding four blocks probably only comprise noise signals. At instruction 57 the mean value is then calculated on the basis of the previous noise value and the variable MIN. At instruction 58 the new noise value is made equal to the maximum of Θ and the minimum of AV and 1.5* the previous value of N. The comparison with 1.5*N is made to avoid the value of the noise level increasing abruptly when strong stationary signals not being noise suddenly appear. The comparison with Θ takes place to avoid the value of the noise power becoming and remaining 0. After completion of instruction 58, the function is left.

Figure 5:
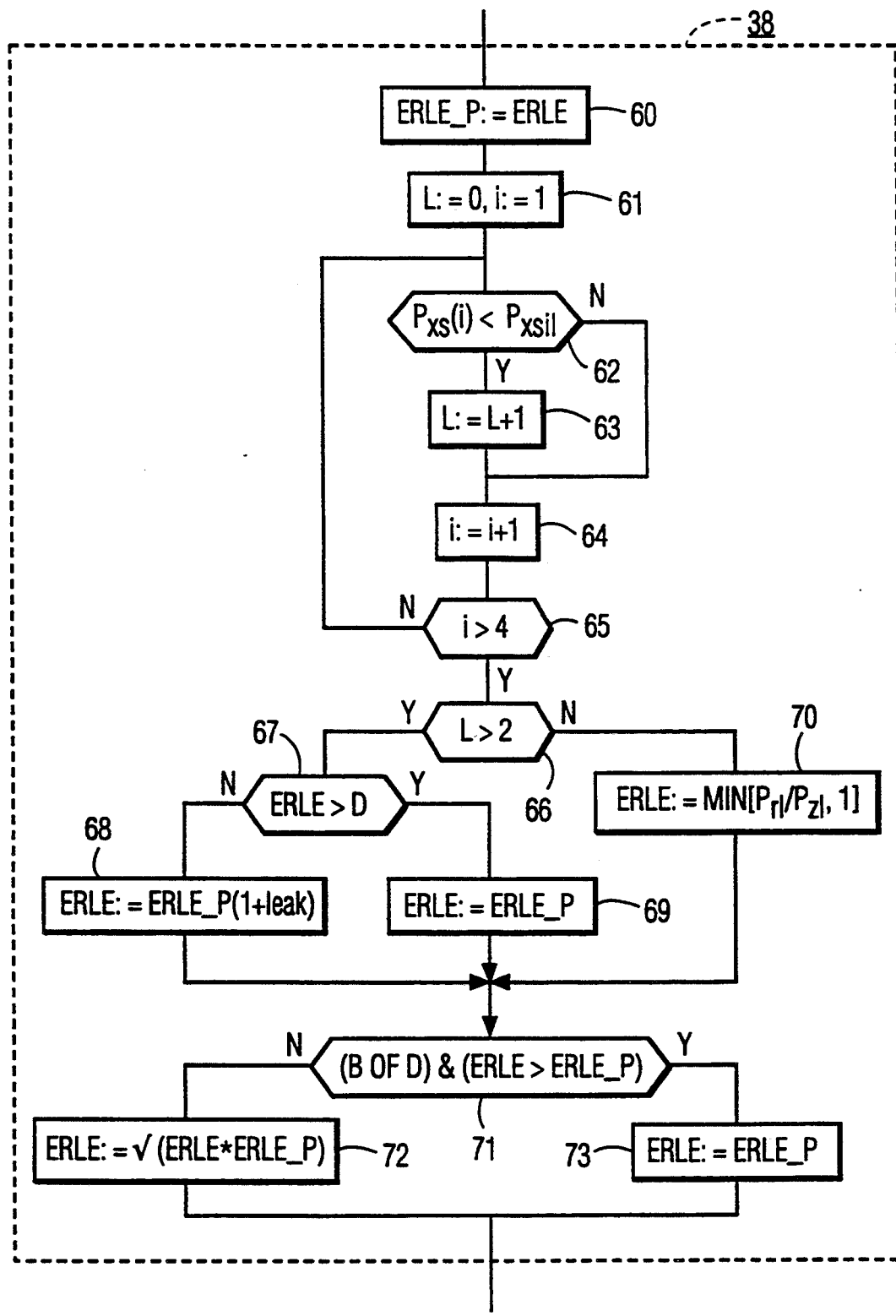
FIG. 5 shows a flow chart of block 38 in the program shown in FIG. 3 for calculating the value of the adaptive filter echo transfer at a given instant.

In FIG. 5 the numbered instructions of the connotations are as described in the Table below:

| NUMBER | INSCRIPTION | CONNOTATION |
|---|---|---|
| 60 | ERLE_P: = ERLE | The content of variable ERLE is stored in variable ERLE_p. |
| 61 | L: = O, i: = 1 | The counters L and i are set to 0 and 1 respectively. |
| 62 | $P_{xs}(i) < P_{xsil}$ | The signal power in signal x is compared with a threshold value. |
| 63 | L: = L + 1 | The counter L is incremented by 1. |
| 64 | i: = i + 1 | The counter i is incremented by 1. |
| 65 | i > 4 | The content of counter i is compared with 4. |
| 66 | L > 2 | The contents of counter L is compared with 2. |
| 67 | ERLE > D | The echo transfer factor ERLE is compared with D. |
| 68 | ERLE: = ERLE_P(1 + leak) | The echo transfer factor ERLE is made equal to the previous value multiplied by a constant factor. |
| 69 | ERLE: = ERLE_P | The current value of ERLE is made equal to the value of ERLE_P. |
| 70 | ERLE: = MIN[$P_{rl}/P_{zl}$, 1] | The new value of ERLE is calculated on the basis of the signal powers $P_{rl}$ and $P_{zl}$. |
| 71 | (B OR D) & (ERLE > ERLE_P) | Verification of the presence of near-end speech. |
| 72 | ERLE: = √(ERLE*ERLE_P) | The mathematical mean of the new value of ERLE and previous value of ERLE is calculated. |
| 73 | ERLE: = ERLE_P | New value of ERLE is made equal to previous value of ERLE. |

In FIG. 5, at instruction 60, first the previous value of ERLE is transferred to variable ERLE_P. At instruction 61, two counters L and i are set to 0 and 1 respectively. At instructions 62, 63, 64 and 65 there is counted how many times (L) the signal power in signal x lies below a specific value of $P_{xsil}$ in the preceding 4 blocks. At instruction 66, L is compared with 2. If L is greater than 2, it is assumed that the signal power of x is too small to make an accurate estimate of the value of the echo transfer ERLE. At instruction 67 the ERLE value is then compared with the threshold D. If ERLE is smaller than D, ERLE is multiplied by a constant exceeding 1 at instruction 68. This is done because when signal x has too low a value, the adaptive filter will no longer be capable of reproducing the echo signal, which will probably lead to a larger value of the echo transfer due to slow changes in the echo path. At instruction 69 ERLE is made equal to ERLE_P because at that point a certain maximum value of ERLE is attained.

If L is smaller than 2, it is assumed that x is sufficiently large for determining an accurate value of ERLE. At instruction 70 the value of ERLE is then calculated on the basis of the ratio of $P_{rl}$ to $P_{zl}$, while the maximum value which ERLE may assume is smaller than 1.

At instruction 71 it is verified whether the near-end speaker is active, which is the case if FSM is in state B or D, and whether the current value of ERLE exceeds the previous value of ERLE. If the two conditions are satisfied, it is highly likely that the greater value of ERLE is caused by near-end speech in the signal z. The calculated value is then a poor estimate for ERLE and, at instruction 73, the new value of ERLE is made equal to the previous value of ERLE. If the condition of instruction 71 is not satisfied, the new value of ERLE is calculated on the basis of the mathematical mean of the previous and calculated values of ERLE at instruction 72.

Figure 6:
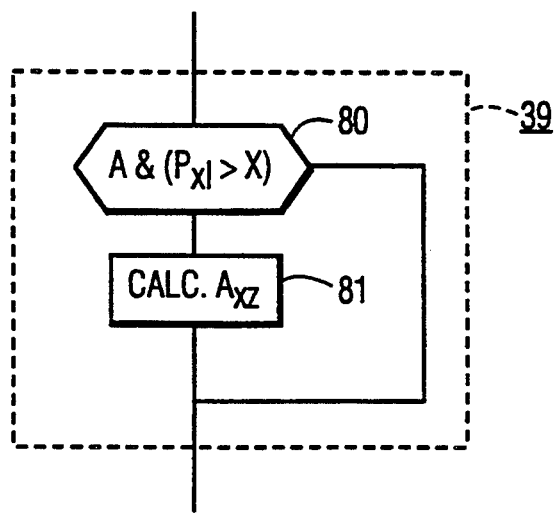
FIG. 6 shows a flow chart of block 39 in the program as shown in FIG. 2 for calculating the acoustic attenuation of the echo path.

In FIG. 6 the instructions have the connotations described in the Table below.

| NUMBER | INSCRIPTION | CONNOTATION |
|---|---|---|
| 80 | A & ($P_{xl} > X$) | It is verified whether only the far-end speaker is active and also whether the signal power of x exceeds a given threshold. |
| 81 | CALC. $A_{xz}$ | The new value of the acoustic attenuation is calculated. |

At instruction 80 it is verified whether only the far-end speaker is active and also whether the signal power of his speech signal exceeds a specific threshold. If this is the case, it is assumed that the value of x is great enough for obtaining an accurate estimate of the acoustic attenuation. At instruction 81 the new estimate of $A_{xz}$ is calculated by averaging the previous value $A_{xz}$ with the ratio of $P_{zl}$ to $P_{xl}$.

What is claimed is:

1. An echo canceller comprising:
    a receive path and a send path each having an input and an output;
    a programmable filter coupled to the receive path for producing an echo signal which is an estimate of an echo produced in an echo path from the output of the receive path to the input of the send path;
    an adaptive filter having a first input oupled to the receive path and a first output coupled to said programmable filter to supply programming parameters thereto, said adaptive filter having an impulse response which is an estimate of the impulse response of said echo path, said adaptive filter comprising detecting means adapted to control whether programming parameters are supplied to said programmable filter;

a first subtractor circuit having a first input coupled to the input of said send path, a second input coupled to the output of said programmable filter, and an output coupled to the output of said send path;

a second subtractor circuit having a first input coupled to the input of said send path, a second input coupled to a second output of said adaptive filter, and an output coupled to a second input of said adaptive filter; and said detecting means operating to block supply of programming parameters from said adaptive filter to said programmable filter when an input signal is supplied to the send path, the presence of said input signal being detected by said detecting means based on a calculation of whether the ratio of a first quantity, derived from the power of said input signal, to a second quantity, derived from the power of an estimated echo signal produced by said adaptive filter at said second output thereof, exceeds a predetermined threshold.

2. Echo canceller as claimed in claim 1, characterized in that the detection means determines the signal owers of said input and estimated echo signals on the basis of the instantaneous signal powers of these signals averaged over a specific period of time.

3. Echo canceller as claimed in claim 2, characterized in that the detection means add a correction term to the power of the signal at the second output of the adaptive filter at a current measuring instant before calculatinq said ratio.

4. Echo canceller as claimed in claim 3, characterized in that the correction term is a sum weighted with a weight factor of the powers of the signal at the second output of the adaptive filter at a number of measuring instants during a time interval ending at a present instant reduced by the duration of the adaptive filter impulse response, the weight factor being a monotonously decreasing exponential function of the difference between the signal powers at the present instant and the measuring instants.

5. Echo canceller as claimed in claim 1, characterized in that the detection means add a correction term to the power of the signal at the second output of the adaptive filter at a current measuring instant before calculating said ratio.

6. Echo canceller as claimed in claim 5, characterized in that the correction term is a sum weighted with a weight factor of the powers of the signal at the second output of the adaptive filter at a number of measuring instants during a time interval ending at a present instant reduced by the duration of the adaptive filter impulse response, the weight factor being a monotonously decreasing exponential function of the difference between the signal powers at the present instant and the measuring instants.

* * * * *